Sept. 20, 1932.   J. L. McKINLEY   1,878,977
BATTERY SWITCH
Filed July 2, 1931   2 Sheets-Sheet 1

Inventor
James L. McKinley

By Clarence A. O'Brien
Attorney

Sept. 20, 1932.  J. L. McKINLEY  1,878,977
BATTERY SWITCH
Filed July 2, 1931  2 Sheets-Sheet 2
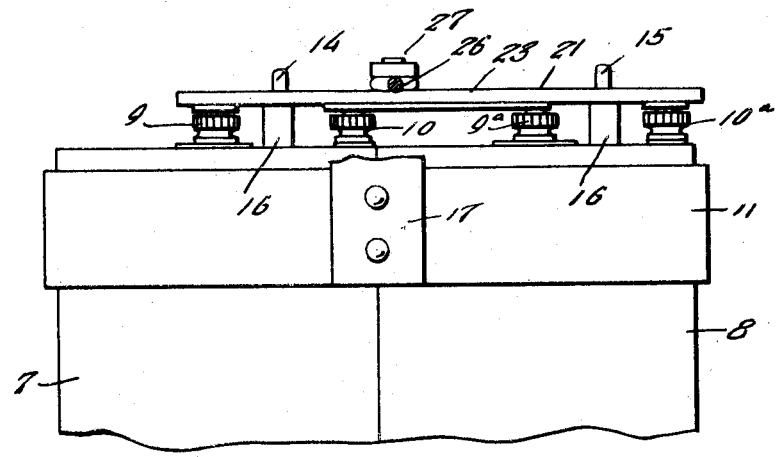
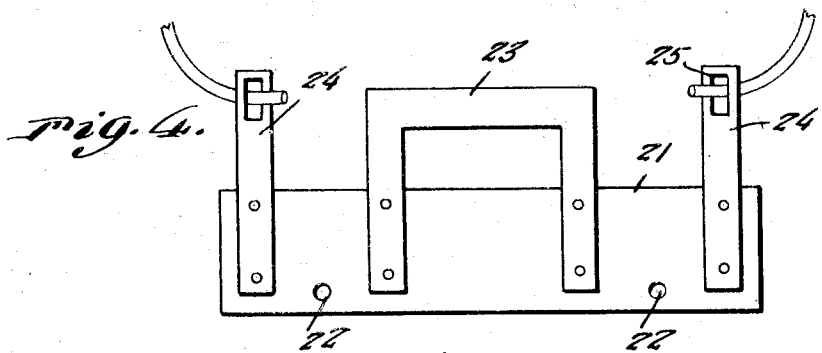
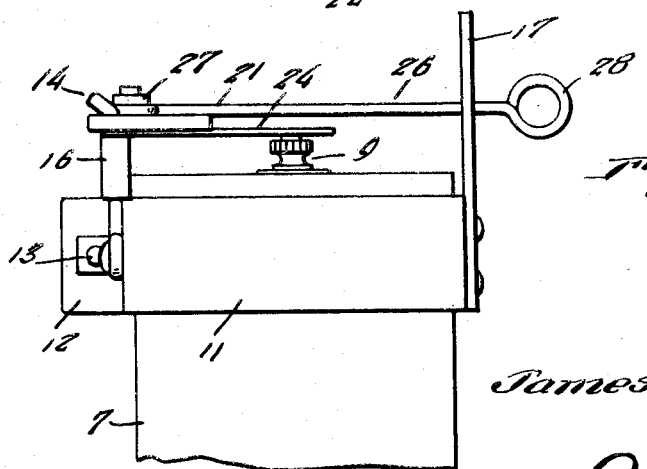
Inventor
James L. McKinley
By Clarence A. O'Brien
Attorney Patented Sept. 20, 1932

1,878,977

UNITED STATES PATENT OFFICE

JAMES L. McKINLEY, OF APPLETON CITY, MISSOURI

BATTERY SWITCH

Application filed July 2, 1931. Serial No. 548,456.

This invention relates to an improved circuit closing device in the nature of an attachment for dry cell batteries and it may be briefly referred to as a battery switch.

Occasion is frequently found in the use of dry cells to have a convenient switch for controlling the supply of current at the discretion of the user. Generally, the current conducting wires are simply detached whenever it is desired to disconnect the current. In some instances, a small switch is arranged in the wire line.

I have found it expedient and practical to accomplish this task by providing a switch in the form of an attachment which can be applied to the dry cells, said attachment embodying novel circuit make and break means and additional manually regulated means for maintaining the switch closed or open, whichever is desired.

The particular details utilized in the preferred embodiment of the invention will become more readily apparent from the following description and drawings. In the drawings:

Figure 3 is a fragmentary sectional and elevational view of the assembly shown in Figure 1.

Figure 4 is a bottom plan view of the contact equipped insulator plate.

Figure 5 is an end view of the structure seen in Figure 1.

Figure 1:
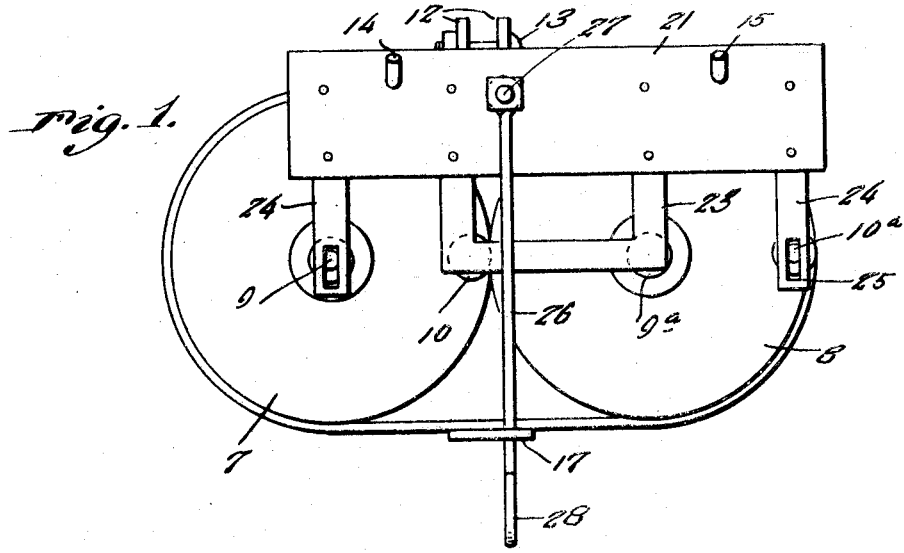
Figure 1 is a top plan view of the switch applied to a pair of dry cell batteries.
Figure 2:
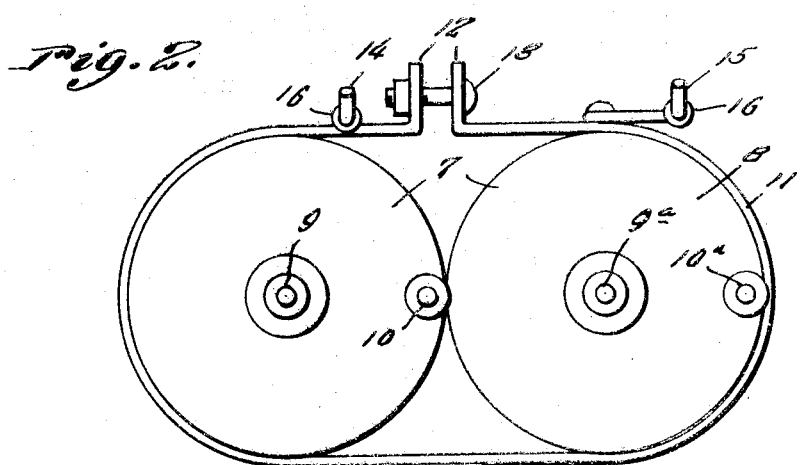
Figure 2 is a plan view with the detachable portion of the structure removed.
Figure 6:
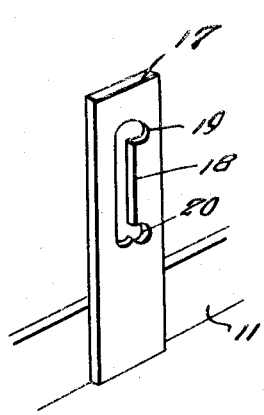
Figure 6 is a fragmentary perspective view.

In the drawings, the batteries in Figures 1 and 2 are designated by the numerals 7 and 8. These are conventional dry cells and include positive and negative terminals or binding posts 9, 9a and 10 and 10a. In accordance with the invention I provide a mounting which comprises a clamp in the form of a flat metal strap 11 and this embraces the upper end portions of the dry cells and has its outturned ends 12 secured together by a bolt 13.

Carried by this strap are hinge forming lugs 14 and 15 whose upper ends are slightly hooked. On each lug is a spacing sleeve or bushing 16. Opposite to the end portions 12 and mounted on the front of the clamp is an upright or arm 17 fashioned with a vertically elongated slot 18 having upper and lower notches 19 and 20 constituting keeper seats.

The circuit make and break device comprises a plate 21 of insulation having apertures 22 to slip over the hooked ends 14 and 15 of the lugs. Attached to the central part of this plate is a U-shaped metallic contact 23 which bridges the post 10 and 9a. At opposite ends of the plate are additional contact arms 24 and 25 which rest down on the terminals 9 and 10a as seen in Figures 1 and 3.

The free ends of the arms 24 are slotted as indicated at 25 to accommodate current conducting wires. The numeral 26 designates an adjusting wire or lever secured by fastenings 27 to the plate and having a finger ring 28 on its outer end. This is adapted to extend through the slot 18 and to be selectively seated in either of the keeper seats 19 or 20 as desired.

Obviously when the lever is in the seat 19, the plate 21 and its contact element is raised to a position to break the circuit. When the lever is in the notch or keeper seat 20 this brings the plate 21 down to a plane to cause the contact elements 23 and 24 to rest on the binding posts of the dry cell.

A dry cell switch attachment of this type has been found to be highly useful and satisfactory in rural house wiring, particularly for telephone use, where it is desired to conserve or retain the longevity or life of the dry cells.

It is thought that the description taken in connection with the drawings will enable a clear understanding of the invention to be had. Therefore, a more lengthy description is thought unnecessary.

While the preferred embodiment of the invention has been shown and described, it is to be understood that minor changes in shape, size, and arrangement of details, coming within the field of invention claimed may be resorted to in actual practice if desired, without departing from the spirit and scope of the appended claims.

I claim:

1. In a structure of the class described, in combination, a pair of conventional dry cells, a clamp detachably embracing the upper end portions of said cells, a hingedly mounted plate carried by said clamp, and contact elements on said plate co-operable with the terminals of the dry cells, together with means for raising and lowering and retaining said plates in raised and lowered positions, whereby to open and close the switch at will.

2. A battery switch of the class described comprising a plate of insulation material, a pair of slotted arms attached to the opposite end portions of the plate, a U-shaped contact member attached to the intermediate portion of the plate, said contact members being adapted to complete the circuit between the companion terminals of a pair of dry cells, and means for detachably and hingedly mounting said plate on the upper end portions of the dry cell.

3. A battery switch of the class described comprising a plate of insulation material, a pair of slotted arms attached to the opposite end portions of the plate, a U-shaped contact member attached to the intermediate portion of the plate, said contact members being adapted to complete the circuit between the companion terminals of a pair of dry cells, and means for detachably and hingedly mounting said plate on the upper end portions of the dry cell, said means comprising a detachable clamping band.

4. A battery switch in the form of an attachment comprising a clamping band adapted to embrace the upper end portions of a pair of dry cells, a slotted keeper member carried by said clamp, a pair of upstanding hinge-forming lugs carried by said clamp, an apertured plate of insulation material detachably engageable with said lugs, contact elements carried by said plate, and an operating and retaining lever also carried by the plate and engageable with the keepers.

5. In a structure of the class described, in combination, a pair of dry cells, a clamping band embracing and detachably connected to the upper end portions of the dry cells, an upstanding member on the band formed with a vertically elongated slot having upper and lower notches constituting keeper seats, a pair of hooked hinge-forming lugs also carried by said band, an apertured plate of insulation material, a pair of slotted contact arms carried by the end portions of the plate and engageable with the adjacent binding post on the dry cells, a U-shaped contact member carried by the intermediate portion of the plate and bridging positive and negative terminals on the dry cells, and a rod member fastened to the intermediate portion of said plate extending through the slot in said retaining member and selectively engageable with said keeper notches.

In testimony whereof I affix my signature.

JAMES L. McKINLEY.